United States Patent
Akahane

[11] Patent Number: 5,881,104
[45] Date of Patent: Mar. 9, 1999

[54] VOICE MESSAGING SYSTEM HAVING USER-SELECTABLE DATA COMPRESSION MODES

[75] Inventor: Masaaki Akahane, Mahwah, N.J.

[73] Assignees: Sony Corporation, Tokyo, Japan; Sony Electronics Inc., Park Ridge, N.J.

[21] Appl. No.: 622,502

[22] Filed: Mar. 25, 1996

[51] Int. Cl.$^6$ .............................. H04B 1/66; H04B 1/38; H04L 5/16; H04M 1/64

[52] U.S. Cl. .......................... 375/240; 375/240; 375/219; 379/67.1; 379/68; 379/69; 379/88.08; 379/88.1; 379/88.12

[58] Field of Search ..................................... 375/240, 219; 379/67, 68, 88, 89, 69, 67.1, 88.08, 88.1, 88.12

[56] References Cited

U.S. PATENT DOCUMENTS

| | | | |
|---|---|---|---|
| 5,105,197 | 4/1992 | Clagett | 342/419 |
| 5,455,823 | 10/1995 | Noreen et al. | 370/50 |
| 5,546,395 | 8/1996 | Sharma et al. | 370/84 |
| 5,630,012 | 5/1997 | Nishiguchi et al. | 395/2.17 |
| 5,706,211 | 1/1998 | Beletic et al. | 364/514 R |

*Primary Examiner*—Stephen Chin
*Assistant Examiner*—Michael W. Maddox
*Attorney, Agent, or Firm*—Lise A. Rode, Esq.; Jerry A. Miller

[57] ABSTRACT

There is provided a portable packet switched wireless voice messaging device capable of transmitting and receiving a digital voice signal. The device includes a microphone for inputting a voice message, an encoder for encoding the voice message, a memory for storing the encoded message, a data compressor with variable compression ratio for compressing the encoded message in accordance with a data compression mode selected by the user and a transmitting circuit for transmitting the compressed data with information indicating the mode selected. The device also includes a receiving circuit for receiving an incoming message data which has been compressed in a transmitting side, a detector for detecting the compression mode used in the transmitting side, a data decompressor for decompressing the incoming message data in accordance with the detected mode, a memory for storing the decompressed data, a decoder for decoding the decompressed data and a speaker for reproducing a voice message in accordance with the decoded voice message signal provided by the decoder. The user can select a data compression mode depending upon the importance of his voice message to be transmitted.

23 Claims, 6 Drawing Sheets

VOICE MESSAGING SYSTEM HAVING USER-SELECTABLE DATA COMPRESSION MODES

BACKGROUND OF THE INVENTION

1. Field of the Invention

This invention relates to a two-way wireless messaging system for transmitting and receiving messages. More particularly, this invention relates to a wireless voice messaging system for transmitting and receiving encoded voice signals which are subject to variable data compression.

2. Background

Personal communication systems for enabling users to communicate with each other have become popular in the recent years. While in the past such systems have generally been realized using analog technology, it is desirable to instead use digital processing in order to use limited frequency resources more efficiently as well as reduce signal distortion and degradation and thus improve the overall quality of the voice signal.

In general, in a digital cellular telephone system for transmitting and receiving digital voice signals, an input voice signal is digitized and encoded to speech parameters. A variety of speech encoding/decoding methods have been known for processing digital voice signals. For example, MBE (Multi Band Excitation), SBE (Single Band Excitation), SBC (Sub-Band Coding), Harmonic Coding, LPC (Linear Predictive Coding), DCT (Discrete Cosine Transform), MDCT (Modified DCT) and FFT (Fast Fourier Transform) have been known as such a encoding/decoding method. In addition, CELP (Code Excited Linear Prediction), VSELP (Vector Sum Excited Linear Prediction), PSI-CELP (Pitch Synchronous Innovation - CELP) and RPE-LTP (Regular Pulse Excitation - Long Term Prediction) have also become known as a speech encoding method for digital cellular telephone system.

Such a digital cellular telephone system is called a circuit switched communication and two or more users can interactively communicate with each other in realtime. During the interactive communication, a signal channel is physically established exclusively for the communicating users. The cellular telephone system is relatively expensive because the users are charged for the exclusive use of the signal channel, for example, per minute basis. Even when a user just wants to talk for a short period to send a simple voice message, the service takes a high charge for using a cellular network in conjunction with PSTN (Public Switch Telephone Network).

Unlike a cellular telephone system for a realtime communication, packet switched communication systems are also known. Packet switched communication systems are considered as non-realtime communication systems. One of the non-realtime communication systems is a one-way pager which is capable of receiving a text-based short message. A two-way pager terminal is also known for providing limited transmitting capability as well as receiving capability of a text-based short message. For the non-realtime communication system, there is no need to establish an exclusive signal channel between the communicating users. Therefore, the charge for the system is based on the amount of data transmitted, for example, per byte basis. However, such a pager system cannot transmit a voice message.

SUMMARY OF THE INVENTION

Accordingly, it is an object of the present invention to provide a packet switched wireless communication system for transmitting/receiving a voice message.

It is another object of the present invention to provide a portable voice messaging device for transmitting/receiving a voice message with inexpensive air charge.

It is a further object of the present invention to provide a user with options of a trade-off between transmission qualities and network charges depending upon the importance of his voice message.

In one aspect of the present invention, there is provided a transmitter including an encoder for encoding an input voice message, a memory for storing the encoded voice message provided by the encoder and a data compressor for compressing the encoded voice message read from the memory and producing a compressed data in accordance with a transmission mode selected by the user. The compressed data is transmitted to destination receiver terminals.

In another aspect of the present invention, there is provided a receiver including a receiving circuit for receiving an encoded message data and a transmission mode signal indicating a data compression mode used in a transmitting side, a memory for storing the encoded message data received by the receiving circuit, a data decompressor for decompressing the encoded message data in accordance with the mode detected, a decoder for decoding the decompressed data read from the memory and providing a voice message signal, and a speaker for reproducing a voice message in accordance with the voice message signal provided by the decoder.

In accordance with the present invention, since a user can select one of data compression modes depending upon the importance of his voice message, a cost effective transmission of the voice message can be achieved.

DETAILED DESCRIPTION OF THE PREFERRED EMBODIMENT

Referring to the accompanying drawings, an embodiment of the voice message transmitter/receiver according to the present invention will be described hereinafter.

Figure 1:
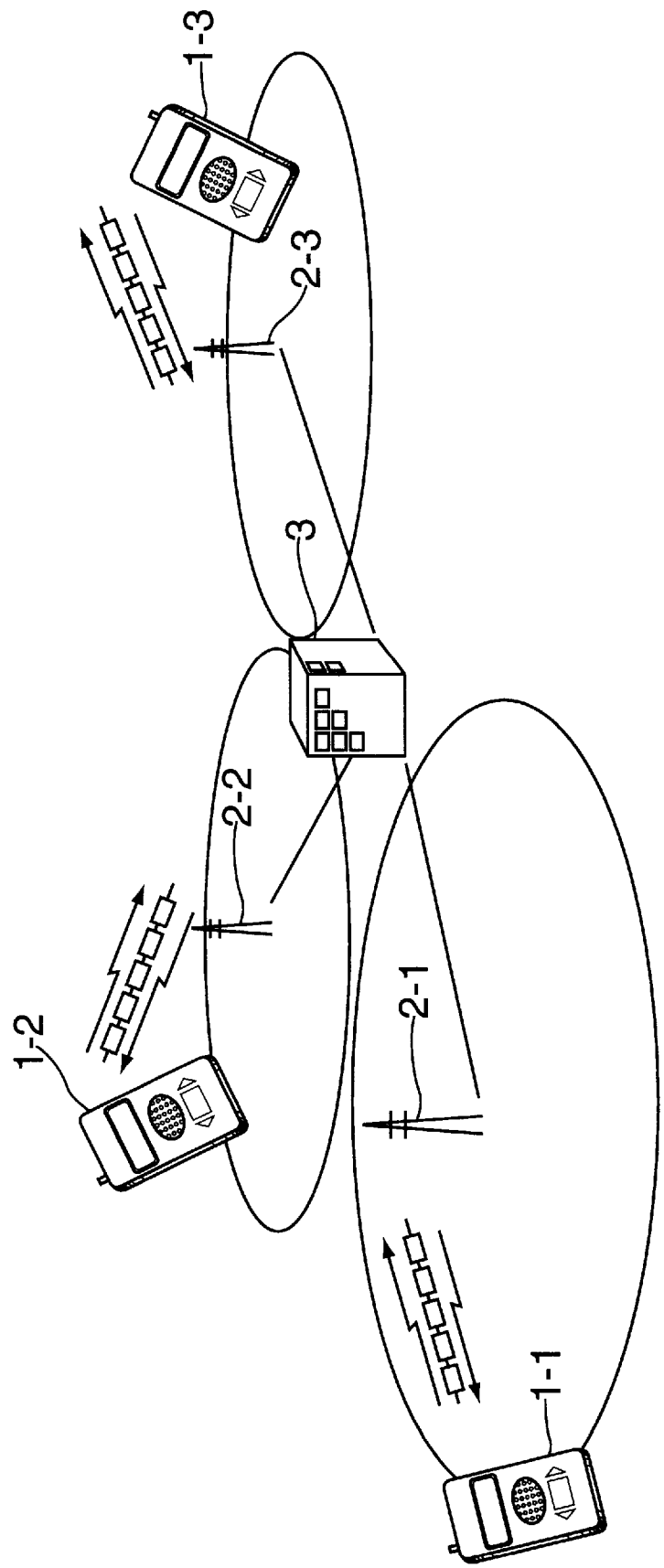
FIG. 1 shows a wireless voice messaging system over packet switched network, to which system the present invention applies.

FIG. 1 shows a wireless voice messaging system over packet switched network, to which system the present invention applies. Portable radio transmitter/receiver terminals 1-1, 1-2 and 1-3 are provided for users. If a user of terminal 1-1 wants to send a voice message to a user of terminal 1-2, the user of terminal 1-1 inputs a voice message through a microphone and sets a destination information specifying terminal 1-2 as a destination. Terminal 1-1 encodes the input voice message and transmits the coded message as well as the destination information to a base station 2-1 which covers an area where terminal 1-1 is located. The coded message and the destination information are transmitted over the air as a packet data.

Base station 2-1 receives the packet data transmitted from terminal 1-1 and transfers the received packet data to a network switching control center 3. Network switching control center 3 sends the packet data to a destination base station 2-2 which covers an area where destination terminal 1-2 is located. Base station 2-2 transmits the packet data over the air to destination terminal 1-2 in accordance with the destination information in the packet data. When terminal 1-2 receives a complete message, a beep, vibration or other conventional notification tells the user of arrival of a new incoming message. The user of terminal 1-2 can retrieve the new incoming message when he reproduces it through a speaker on terminal 1-2.

Figure 2:
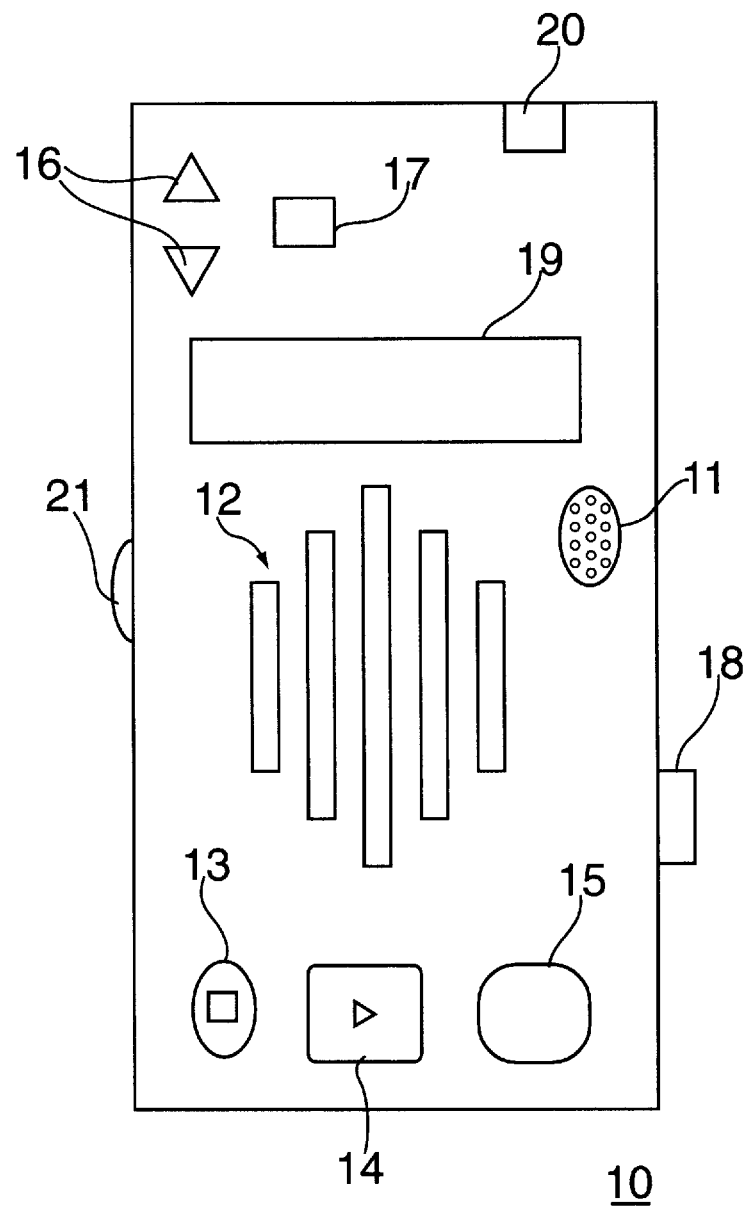
FIG. 2 shows a portable transmitter/receiver terminal according to the present invention.

FIG. 2 shows an embodiment of a portable transmitter/receiver terminal according to the present invention. A portable transmitter/receiver terminal 10 has a microphone 11, a speaker 12, a record key 13, a playback key 14, a send key 15, up/down keys 16, an enter key 17, a delete key 18, a display 19, an incoming message indicator 20 and a volume key 21.

Record key 13 is mainly used for recording an outgoing message which a user wants to send. Record key 13 is also used for a voice memo function; for recording a message which the user wants to hear later. Before sending the outgoing message, the user can hear and check it. Playback key 14 is used for reproducing the outgoing message which has been previously recorded. Playback key 14 is also used for reproducing an incoming message which has been received. After the user reproduces the outgoing message and is satisfied therewith, he sets a destination(s) to which he wants to send the message. Then, the user uses send key 15 to transmit the outgoing message. The user may send the outgoing message without reproducing the same.

Display 19 selectively displays a destination information or other information selected by the user. Up/down keys 16 are used for scrolling up/down the information displayed on display 19. Incoming message indicator 20 indicates that a new incoming message has been received and stored in an inside memory. The recorded outgoing message or the stored incoming message can be deleted from the memory by using delete key 18. Volume key 21 controls a playback volume.

Figure 3:
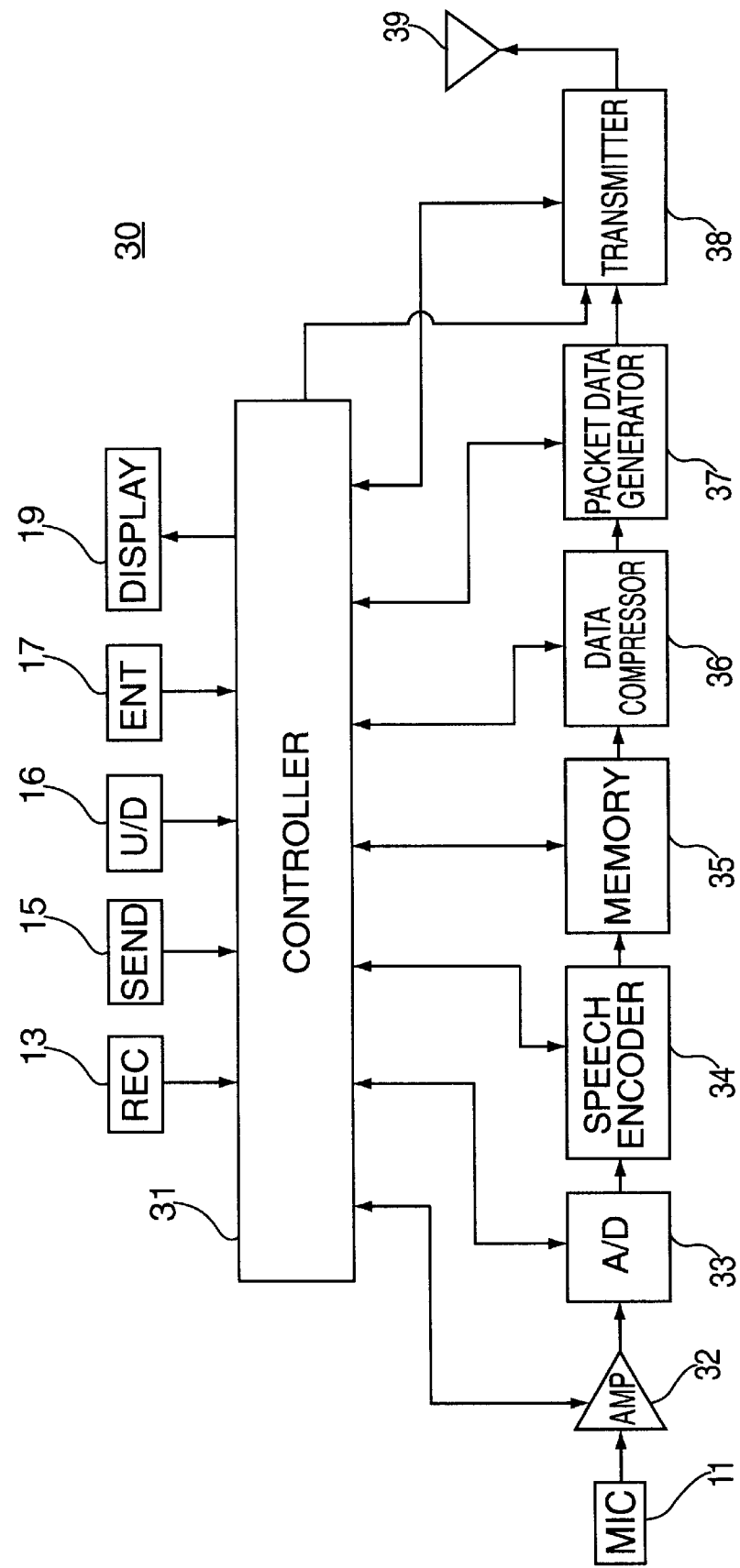
FIG. 3 is a block diagram showing an embodiment of a transmitter included in a transmitter/receiver terminal according to the present invention.

Transmitter/receiver terminal 10 includes both a transmitting circuit and a receiving circuit therein. FIG. 3 is a block diagram showing an embodiment of such a transmitting circuit in transmitter/receiver terminal 10. In FIG. 3, microphone 11, record key 13, send key 15, up/down keys 16, enter key 17 and display 19 are indicated by the same reference numerals as used in FIG. 2.

Transmitting circuit 30 includes a controller 31, an amplifier 32, an A/D converter 33, a speech encoder 34, a memory 35, a data compressor 36, a packet data generator 37 and a transmitter 38. When a user operates record key 13, controller 31 sends control signals to amplifier 32, A/D converter 33 and encoder 34 so that these circuits start their operations. Controller 31 also sends a write command signal to memory 35 so that memory 35 starts its writing operation. While the user holds down record key 13, he speaks a voice message through microphone 11. The input voice message is supplied from microphone 11 to A/D converter 33 which converts the voice message to a digital signal. A/D converter 33 uses 8 KHz sampling frequency, for example. A/D converter 33 supplies the digital message signal to speech encoder 34. Speech encoder 34 encodes the digital signal to an encoded data. Speech encoder 34 supplies the encoded data to memory 35 for storing them. When the user finishes an entire message, he releases record key 13.

A high-efficiency encoding method used in speech encoder 34 may be of various kinds. As mentioned above, such a speech encoding method may be Multi Band Excitation (MBE), Single Band Excitation (SBE), Sub-band Coding (SBC), Harmonic Encoding, Linear Predictive Coding (LPC), Discrete Cosine Transforming (DCT), Modified Discrete Cosine Transforming (MDCT), Fast Fourier Transforming (FFT), Code Excited Linear Predictive (CELP) coding, Vector Sum Excited Linear Predictive (VSELP) coding, Pitch Synchronous Innovation-CELP (PSI-CELP) coding and Regular Pulse Excitation Long Term Prediction (RPE-LTP) coding. By using any one of these encoding methods or other similar encoding method, an amount of the digital signal from A/D converter 33 can be suppressed with acceptable degradation of quality of the voice message. Alternatively, the digital signal can be directly supplied from A/D converter 33 to memory 35 without being encoded by speech encoder 34 even though memory 35 would need more storage capacity than when speech encoder 34 is used. In this particular embodiment, speech encoder 34 encodes the digital signal from A/D converter 33 by the MBE encoding/decoding method and generates as the encoded data four kinds of speech parameters; a Linear Spectrum Pair (LSP) parameter, a pitch parameter, a voice/unvoice discrimination parameter and an amplitude parameter.

Figure 4:
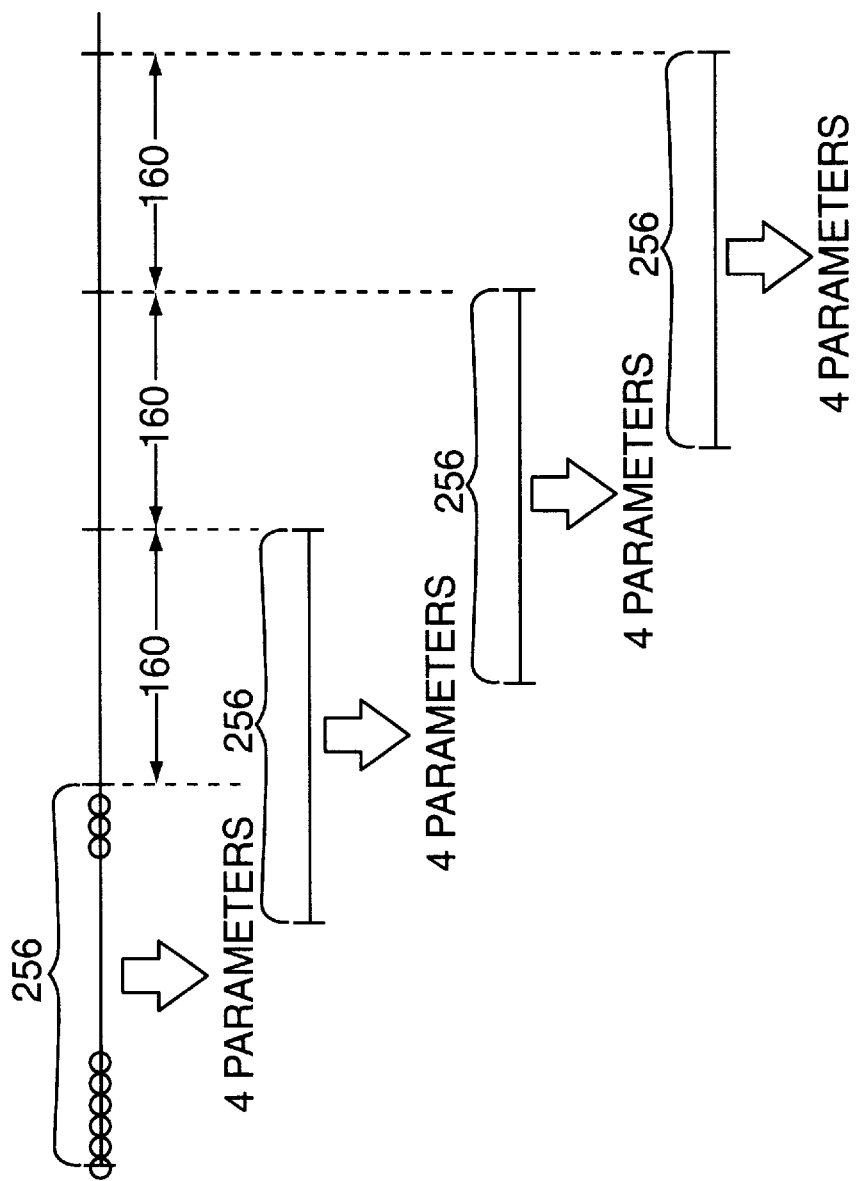
FIG. 4 is a drawing to explain a function of an encoder for encoding a digital voice signal to speech parameters.

As shown in FIG. 4, speech encoder 34 generates one set of the four parameters by processing a block of 256 samples of the digital signal from A/D converter 33. However, the next block of 256 samples for calculation of the next set of four parameters proceeds only for a frame period comprising 160 samples with the remaining 96 samples overlapping. Since A/D converter 33 produces each sample at 8 KHZ sampling frequency, one frame of 160 samples are equivalent to 20 ms. Therefore, the four parameters are updated at every 20 ms. Speech encoder 34 for providing the four parameters are described in more detail in a co-pending U.S. patent application, Ser. No. 08/518298, filed on Aug. 23, 1995, now U.S. Pat. No. 5,749,065, and assigned to the same assignee of this application. Speech encoder 34 supplies a series of the four speech parameters to memory 35 for storing them.

Referring back to FIG. 3, after recording a voice message, the user inputs a destination information by scrolling numerical or alphabetical characters on display 19 by using up/down keys 16 and enter key 17. Controller 31 supplies the destination information to packet data generator 37. The user also chooses a data compression mode. Selection of the data compression mode can be made either before or after inputting the destination information. In this embodiment there are provided three data compression modes; "Regular", "Low" and "Extra Low" modes. The user operates up/down keys 16 and enter key 17 to choose one of the three modes. Controller 31 sends a mode selection signal to data compressor 36 and packet data generator 37 in accordance with the user's selection of the mode.

The "Regular" mode is used when the user wants to send a message including important information such as credit card numbers or telephone numbers. In the "Regular" mode, data compressor 36 does not change an amount of the encoded data supplied from memory 35. Transmission of the message in the "Regular" mode is of the highest quality.

The "Low" mode is suitable for sending a less important message. In the "Low" mode, data compressor 36 compresses an amount of encoded data supplied from memory 35. Due to the data compression, the quality of the transmitted message in the "Low" mode is lower than that of the "Regular" mode. However, the user can save air charges because the "Low" mode needs to send less amount of data for the transmission of the message of the same length than the "Regular" mode.

The "Extra Low" mode is suitable for sending a relatively unimportant message. In the "Extra Low" mode, data compressor 36 applies more data compression than in the "Low" mode. Because of the increased data compression, the amount of the encoded data supplied from memory 35 is further suppressed. The quality of the transmitted message is the lowest in the "Extra Low" mode, but the quality is still sufficient to be comprehensive. The user can save air charges the most because the "Extra Low" mode needs to send the least amount of data for transmission of the message of the same length among the three modes.

After the user inputs the destination information and selects one of the three modes, he can send the recorded message by operating send key 15 at any time. When send key 15 is operated, controller 31 sends a read command signal to memory 35. Controller 31 also sends control signals to data compressor 36, packet data generator 37 and transmitter 38 so that these circuits start their operations. In response to the read command signal, the encoded data, that is, a series of the speech parameters, are read out from memory 35 and supplied to data compressor 36. Data compressor 36 compresses an amount of the encoded data in accordance with the compression mode information supplied from controller 31.

Suppose that the user inputs a 4-second voice message. Since the four speech parameters are obtained every 20 ms in this embodiment, data compressor 36 receives 200 sets of the speech parameters for the 4-second voice message. As described above, there are provided three compression modes; "Regular", "Low" and "Extra Low" modes. When the user chooses the "Regular" mode, no data compression applies. Therefore, in the "Regular" mode, data compressor 36 does not change the 200 sets of the speech parameter and simply supplies them to packet data generator 37.

Figure 5A:
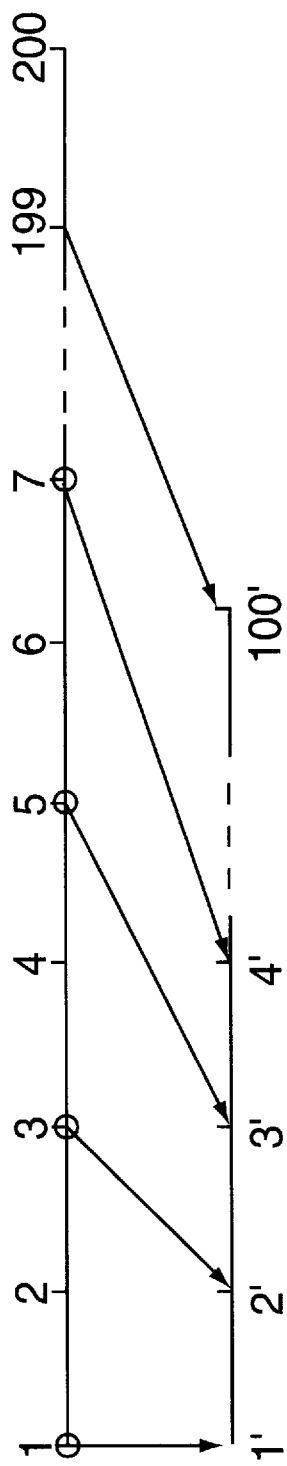
FIG. 5A–5C explain a function of a data compressor for compressing speech parameters.

When the "Low" mode is chosen by the user, data compressor 36 compresses the encoded data read out from memory 35. If a compression ratio in the "Low" mode is set as 2:1, for example, data compressor 36 compresses the 200 sets of the speech parameters into 100 sets. As shown in FIG. 5A, data compressor 36 receives data 1, data 2, data 3, . . . and data 200, each representing a set of the four speech parameters. Data compressor 36 picks out only odd-numbered data so that 100 sets of the speech parameters, data 1', data 2', . . . and data 100' are obtained. Data compressor 36 outputs the 100 sets of the speech parameters at the same data rate as the original 200 sets of the speech parameters. Even though the data rates of the input and output of data compressor 36 are the same, the total length of the data, i.e., the total amount of the data is reduced from the 200 sets to the 100 sets by data compressor 36. Data 1', data 2', . . . and data 100' are supplied to packet data generator 37.

Figure 5B:
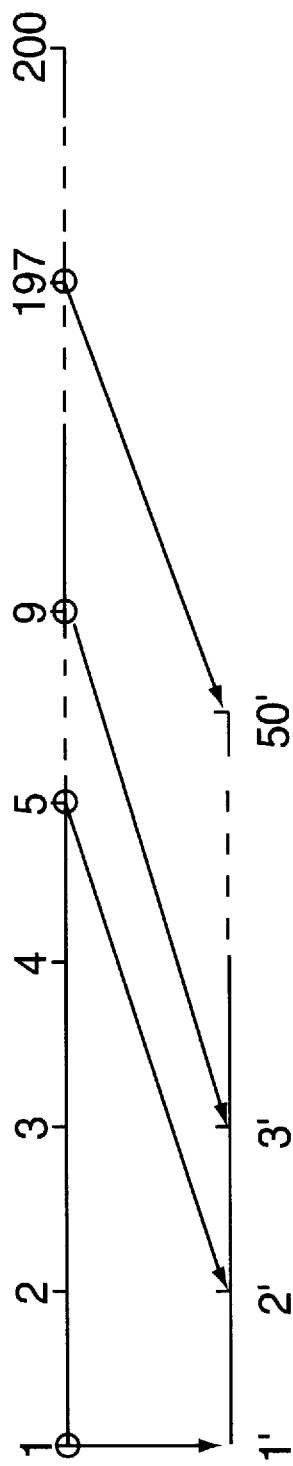

Similarly, if the user chooses the "Extra Low" mode of which compression ratio is set as 4:1, for example, the 200 sets of the speech parameters are compressed to 50 sets thereof. As shown in FIG. 5B, data compressor 36 picks out only data 1, data 5, data 9 . . . and data 197 among the 200 sets of the speech parameters from memory 35. As a result, 50 sets of the speech parameters, data 1', data 2', . . . and data 50' are obtained. Data compressor 36 outputs the 50 sets of the speech parameters at the same data rate as the original 200 sets of the speech parameters. The total amount of data is reduced to one-fourth in the "Extra Low" mode.

Figure 5C:
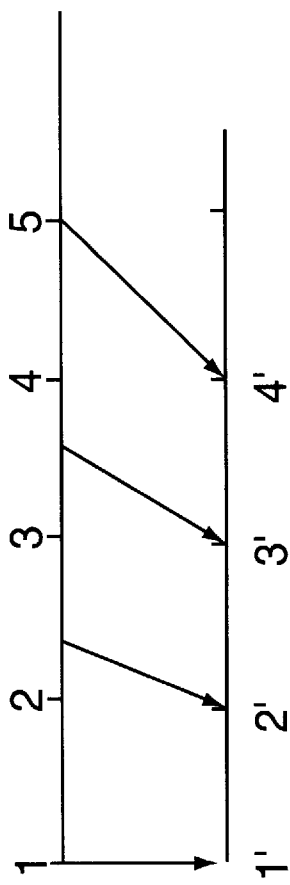

Though the compression ratios are selected as 2:1 and 4:1 for the "Low" and "Extra Low" modes respectively in this embodiment, any other compression ratio can be used. For example, if compression ratio of 4:3 is used, data 1, data 2, data 3 and data 4 are compressed into data 1', data 2' and data 3' as shown in FIG. 5C. Data 1 can be directly used as data 1'. Data 2' can be calculated by interpolating data 2 and data 3 in a conventional interpolation technique, i.e., data 2'= ($2/3 \times$data 2)+($1/3 \times$data 3). Similarly, data 3' can be obtained by interpolation between data 3 and data 4, i.e., data 3'=($1/3 \times$data 3)+($2/3 \times$data 4). Data 5 can be directly used as data 4'.

Referring back to FIG. 3, data compressor 36 supplies a compressed data to packet data generator 37. Packet data generator 37 combines the compressed data from data compressor 36 with the compression mode information and the destination information supplied from controller 31 and forms packet data. The packet data is also formed to include synchronizing bits, error correction bits and an end flag bit indicating the end of the entire voice message. Packet data generator 37 supplies the packet data to transmitter 38. Transmitter 38 transmits the packet data through an antenna 39. The packet data is sent to a corresponding base station. The base station sends the packet data to a network switching control center. The network switching control center sends the packet data to a destination base station which transmits them to a destination transmitter/receiver terminal.

Figure 6:
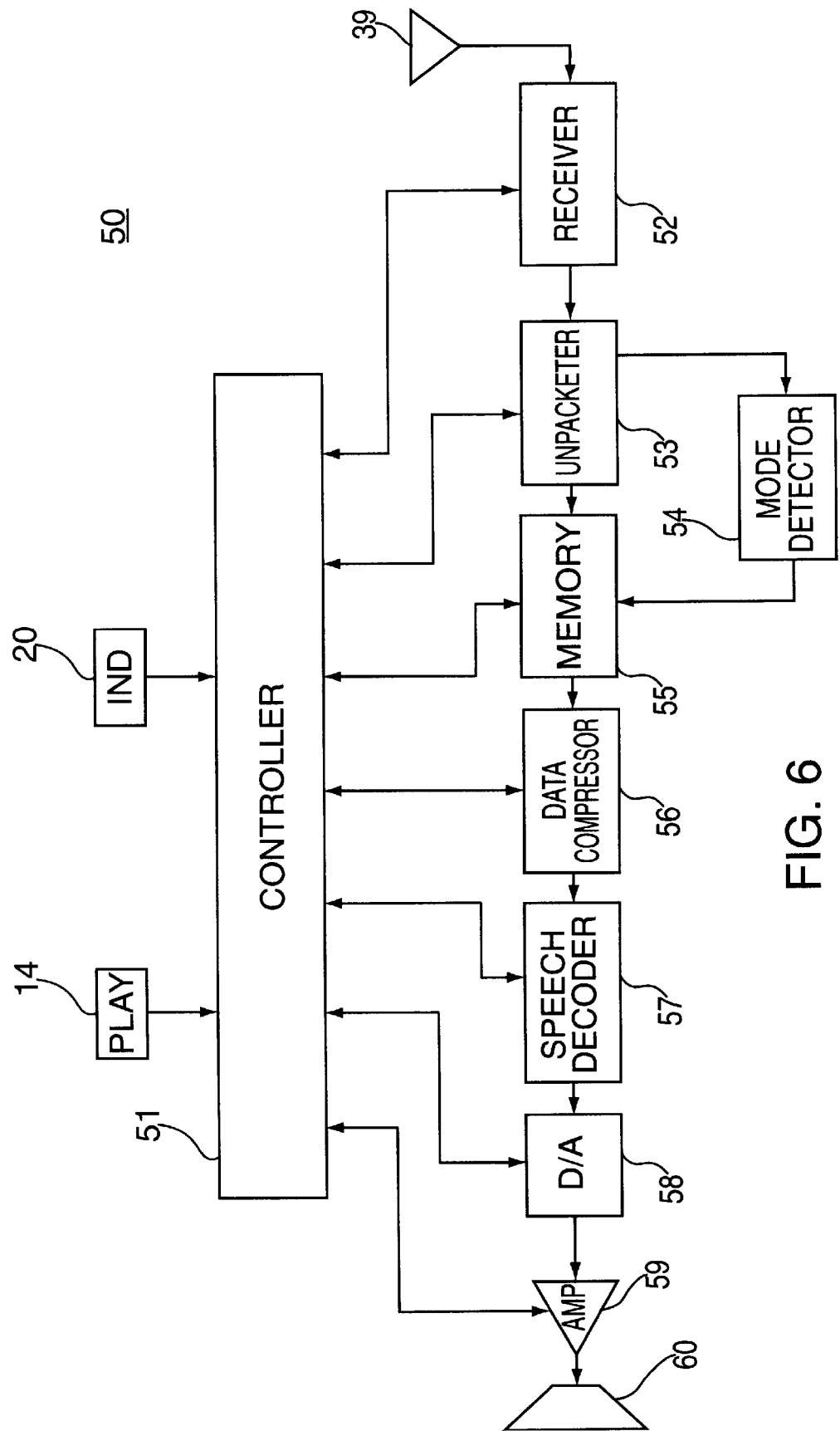
FIG. 6 is a block diagram showing an embodiment of a receiver included in a transmitter/receiver terminal according to the present invention.

FIG. 6 is a block diagram showing an example of a receiver circuit included in transmitter/receiver terminal 10. A receiving circuit 50 includes a controller 51, a receiver 52, an unpacketer 53, a mode detector 54, a memory 55, a data decompressor 56, a decoder 57, a D/A converter 58, an amplifier 59 and a speaker 60. Receiver 52 receives the packet data transmitted from the base station which covers the area where terminal 10 is located. The received packet data is supplied to unpacketer 53. Unpacketer 53 unpackets the packet data and generates the compressed speech parameters and the compression mode information. Then, unpacketer 53 sends the compressed speech parameter and the compression mode information to memory 55 and mode detector 54, respectively. Unpacketer 53 also detects the end flag bit included in the packet data and determines whether the entire message is received or not. When the entire message is received, unpacketer 53 informs controller 51 that the entire message has been received. Mode detector 54 detects the compression mode from the compression mode information and supplies a mode control signal to memory 55. Memory 55 stores the compressed speech parameters supplied from unpacketer 53 and the mode control signal supplied from mode detector 54.

When memory 55 stores the compressed speech parameters of the entire incoming message, controller 51 controls incoming message indicator 20 to be lit so that the user knows arrival of the new incoming message. Then, the user operates playback key 14 to reproduce the new incoming voice message at any time. When playback key is operated, controller 51 controls memory 55 to send the compressed speech parameters and the mode control signal stored therein to data decompressor 56. Data decompressor 56 decompresses the compressed speech parameters in accordance with the mode control signal.

The function of data decompressor 56 is opposite to that of data compressor 36 shown in FIG. 3. When data decompressor 56 decompresses amount of the data of the speech parameters, conventional interpolation technique is used. Referring back to FIG. 5A, when data decompressor 56 receives the 100 sets of the speech parameters, data 1', data 2', data 3', . . . and data 100' which have been compressed with compression ratio 2:1, data 1' is used as data 1, data 2' is used data 3, data 3' is used as data 5. Data 2 is obtained by interpolating data 1 (which is data 1') and data 3 (which is data 2'), i.e., data 2=(½×data 1)+(½×data 3). Similarly, data 4 is obtained by interpolating data 3 (which is data 2') and data 5 (which is data 3'). As a result, the received 100 sets of the speech parameters are decompressed to 200 sets thereof. Although some information is lost due to the data compression and decompression processes which cause quantization error, acceptable quality of the voice message is still maintained.

As shown in FIG. 6, data decompressor 56 supplies the decompressed speech parameters to decoder 57. Decoder 57 decodes the speech parameters and generates a digital voice signal. The digital voice signal is sent to D/A converter 58 which converts the digital voice signal to an analogue voice signal. The analogue voice signal is supplied to amplifier 59 and a speaker 60 finally provides the user with a voice message.

Alternatively, the positions of memory 55 and data decompressor 56 can be reversed. In this case, data decompressor 56 decompresses the compressed speech parameters directly supplied from unpacketer 53 in accordance with the mode control signal directly supplied from mode detector 54. Then, data decompressor 56 supplies decompressed speech parameters to memory 55. When the user operates playback key 14, controller 51 controls memory 55 to send the decompressed speech parameters stored therein to decoder 57. The operations thereafter is same as those shown in FIG. 6.

While specific embodiments of the invention have been disclosed, it is to be understood that numerous changes and modifications may be made by those skilled in the art without departing from the scope and intent of the invention.

What is claimed is:

1. A voice messaging transmitter comprising:

input means operable by a user for inputting a voice message;

first data compression means for compressing said voice message and producing a first compressed message data;

memory means for storing said first compressed message data provided by said first data compression means;

mode selection means operable by the user for selecting one of data compression modes each having a different compression ratio and generating a mode signal indicating a mode selected by the user;

transmission start means operable by the user for generating a transmission start signal;

second data compression means responsive to said mode signal and said transmission start signal for compressing said first compressed message data read from said memory means and producing a second compressed data in accordance with said mode; and transmitting means for transmitting said second compressed data and said mode signal.

2. The voice messaging transmitter according to claim 1, further comprising packet data generating means for forming said second compressed data and said mode signal into a packet data, said transmitting means transmitting said packet data.

3. The voice messaging transmitter according to claim 2, further comprising destination setting means operable by the user for setting a destination to which said packet data is delivered, said packet data generating means further forming information of said destination into said packet data.

4. The voice messaging transmitter according to claim 1, wherein said first data compression means compresses said voice message by Multi Band Excitation encoding method.

5. The voice messaging transmitter according to claim 4 wherein said first data compression means provides as said first compressed message data Linear Spectrum Pair information, Pitch information, Voiced/Unvoiced information and Spectrum power information.

6. A portable voice messaging transmitter comprising:

a microphone for inputting a voice message, a first data compressor for compressing said voice message inputted from said microphone and providing speech parameters corresponding to said voice message;

a memory for storing said speech parameters provided by said first data compressor;

a first key operable by a user for selecting one of compression modes each having a different data compression ratio and generating a mode signal indicating a mode selected by the user;

a second key operable by the user for generating a transmission start signal;

a second data compressor responsive to said mode signal and said transmission start signal, for compressing said speech parameters read from said memory and producing a compressed data in accordance with said mode selected by the user operating said first key; and a transmitting circuit for transmitting said compressed data and said mode signal.

7. The portable voice messaging transmitter according to claim 6, further comprising a packet data generator for forming said compressed data and said mode signal into a packet data, said transmitting circuit transmitting said packet data.

8. The portable voice messaging transmitter according to claim 7, further comprising a destination key operable by the user for setting a destination to which said voice message is transmitted, said packet data generator further forming information of said destination into said packet data.

9. The portable voice messaging transmitter according to claim 8, wherein said first data compressor compresses said voice message by Multi Band Excitation encoding method.

10. The portable voice messaging transmitter according to claim 9 wherein said first data compressor provides as said speech parameters Linear Spectrum Pair information, Pitch information, Voiced/Unvoiced information and Spectrum power information.

11. A voice messaging receiver comprising:

receiving means for receiving a compressed message data which has been compressed in a transmitting side in accordance with one of data compression modes each having a different compression ratio and receiving a mode signal indicating a mode used in said transmitting side;

detecting means for detecting said mode based upon said mode signal received by said receiving means;

memory means for storing said compressed message data provided by said receiving means;

reproduction start means operable by a user for generating a reproduction start command;

first data decompressing means responsive to said reproduction start command, for decompressing said compressed message data read from said memory means in accordance with said mode detected by said detecting means and for producing a first decompressed data;

second decompressing means for decompressing said first decompressed data provided by said first decompressing means and providing a second decompressed data as a voice message signal; and speaker means for reproducing a voice message in accordance with said voice message signal provided by said second decompressing means.

12. The voice messaging receiver according to claim 11, wherein said compressed message data has been compressed by Multi Band Excitation encoding method in said transmitting side and said second decompressing means decompresses said first decompressed data by Multi Band Excitation decoding method.

13. The voice messaging receiver according to claim 12, wherein said compressed message data includes Linear Spectrum Pair information, Pitch information, Voiced/Unvoiced information and Spectrum Power information.

14. A voice messaging receiver comprising:

receiving means for receiving a compressed message data which has been compressed in a transmitting side in accordance with one of data compression modes each having a different compression ratio and receiving a mode signal indicating a mode used in said transmitting side;

detecting means for detecting said mode based upon said mode signal received by said receiving means;

first data decompressing means for decompressing said compressed message data in accordance with said mode detected by said detecting means and producing a first decompressed data;

memory means for storing said first decompressed data provided by said first data decompressing means;

reproduction start means operable by a user for generating a reproduction start command;

second data decompressing means responsive to said reproduction start command, for decompressing said first decompressed data read from said memory means and providing second decompressed data as a voice message signal; and speaker means for reproducing a voice message in accordance with said voice message signal provided by said second data decompressing means.

15. The voice messaging receiver according to claim 14, wherein said compressed message data has been compressed by Multi Band Excitation encoding method in said transmitting side and said second data decompressing means decompresses said first decompressed data by Multi Band Excitation decoding method.

16. The voice messaging receiver according to claim 15, wherein said compressed message data includes Linear Spectrum Pair information, Pitch information, Voiced/Unvoiced information and Spectrum Power information.

17. A portable voice messaging receiver comprising:

a receiving circuit for receiving a compressed message data which has been compressed in a transmitting side in accordance with one of data compression modes each having a different compression ratio and receiving a mode signal indicating a mode used in said transmitting side;

a detector for detecting said mode based upon said mode signal received by said receiving circuit;

a memory for storing said compressed message data provided by said receiving circuit;

a playback key operable by a user for generating a reproduction start signal;

a first data decompressor responsive to said reproduction start signal, for decompressing said compressed message data read from said memory in accordance with said mode detected by said detector and producing a first decompressed data;

a second data decompressor for decompressing said first decompressed data provided by said data decompressor and providing second decompressed data as a voice message signal; and a speaker for reproducing a voice message in accordance with said voice message signal provided by said second data decompressor.

18. The portable voice messaging receiver according to claim 17, wherein said compressed message data has been compressed by Multi Band Excitation encoding method in said transmitting side and said second data decompressor decompresses said first decompressed data by Multi Band Excitation decoding method.

19. The portable voice messaging receiver according to claim 17, further comprising an indicator for indicating that a new incoming voice message is received.

20. A portable voice messaging receiver comprising:

a receiving circuit for receiving a compressed message data which has been compressed in a transmitting side in accordance with one of data compression modes each having a different compression ratio and receiving a mode signal indicating a mode used in said transmitting side;

a detector for detecting said mode based upon said mode signal received by said receiving circuit;

a first data decompressor for decompressing said compressed message data in accordance with said mode detected by said detector and producing a first decompressed data;

a memory for storing said first decompressed data provided by said first data decompressor;

a playback key operable by a user for generating a reproduction start signal;

a second data decompressor responsive to said reproduction start signal for decompressing said first decompressed data read from said memory and providing second decompressed data as a voice message signal; and a speaker for reproducing a voice message in accordance with said voice message signal provided by said second data decompressor.

21. The portable voice messaging receiver according to claim 20, wherein said compressed message data has been compressed by Multi Band Excitation encoding method in said transmitting side and said second data decompressor decompresses said first decompressed data by Multi Band Excitation decoding method.

22. The portable voice messaging receiver according to claim 20, further comprising an indicator for indicating that a new incoming voice message is received.

23. A portable wireless voice messaging device comprising:

a microphone for inputting an outgoing voice message, a first data compressor for compressing said outgoing voice message inputted from said microphone and providing speech parameters corresponding to said voice message;

a first memory for storing said speech parameters provided by said first data compressor;

a first key operable by a user for selecting one of compression modes each having a different data compression ratio and generating a first mode signal indicating a first mode selected by the user;

a second key operable by the user for generating a transmission start signal;

a second data compressor responsive to said first mode signal and said transmission start signal, for compressing said speech parameters read from said first memory and producing a compressed data in accordance with said first mode selected by the user operating said first key;

a transmitting circuit for transmitting said compressed data and said mode signal;

a receiving circuit for receiving an incoming voice message data which has been compressed in a transmitting side in accordance with one of said data compression modes and receiving a second mode signal indicating a second mode used in said transmitting side;

a detector for detecting said second mode based upon said second mode signal received by said receiving circuit;

a first data decompressor for decompressing said incoming voice message data in accordance with said second mode detected by said detector and producing a first decompressed data;

a second memory for storing said first decompressed data provided by said first data decompressor;

a third key operable by a user for generating a reproduction start signal;

a second data decompressor responsive to said reproduction start signal for decompressing said first decompressed data read from said second memory and providing a second decompressed data as a voice message signal; and a speaker for reproducing a incoming voice message in accordance with said voice message signal provided by said second data decompressor.

* * * * *